(12) United States Patent
Brotz

(10) Patent No.: US 7,286,993 B2
(45) Date of Patent: *Oct. 23, 2007

(54) HOLOGRAPHIC SPEECH TRANSLATION SYSTEM AND METHOD

(75) Inventor: Gregory R. Brotz, Sheboygan, WI (US)

(73) Assignee: Product Discovery, Inc., Sheboygan, WI (US)

( * ) Notice: Subject to any disclaimer, the term of this patent is extended or adjusted under 35 U.S.C. 154(b) by 397 days.

This patent is subject to a terminal disclaimer.

(21) Appl. No.: 10/898,124

(22) Filed: Jul. 23, 2004

(65) Prior Publication Data

US 2005/0038663 A1   Feb. 17, 2005

Related U.S. Application Data

(63) Continuation-in-part of application No. 10/061,843, filed on Jan. 31, 2002, now Pat. No. 6,978,240.

(51) Int. Cl.
*G06F 17/28* (2006.01)
*G10L 21/00* (2006.01)

(52) U.S. Cl. ............... 704/277; 704/3; 704/8; 704/251

(58) Field of Classification Search ............ None
See application file for complete search history.

(56) References Cited

U.S. PATENT DOCUMENTS

| | | | |
|---|---|---|---|
| 2,777,011 A | 1/1957 | Marks | |
| 2,916,307 A | 12/1959 | Peters | |
| 3,138,796 A | 6/1964 | Withey | |
| 3,154,636 A | 10/1964 | Schwertz | |
| 3,202,985 A | 8/1965 | Perkins et al. | |

(Continued)

FOREIGN PATENT DOCUMENTS

JP      10136327      5/1998

(Continued)

OTHER PUBLICATIONS

Selected pages from: www.zdnet.com/eweek/stories/general/, Callaghan, AskJeeves Teams with General Magic, Nuance to Create Voice Apps, eWEEK, 2 pages, Nov. 6, 2000.

(Continued)

*Primary Examiner*—V. Paul Harper
(74) *Attorney, Agent, or Firm*—Michael Best & Friedrich

(57) ABSTRACT

Some embodiments of the present invention provide a speech translation system comprising a display upon which at least one word spoken by a user can be displayed. The speech translation system can include a holographic storage medium having a plurality of frames, each having data representative of at least one word in a source language. In some embodiments, the system includes one or more lasers positioned to direct a first beam of light to the display to generate a first modified beam of light leaving the display. This modified beam of light can be directed to the holographic storage medium to scan for a matching speech segment stored in the holographic storage medium. Upon detecting a match, some embodiments of the system can generate a translation of the speech segment by receiving a second modified beam of light from the holographic storage medium and carrying information representative of the translation.

17 Claims, 4 Drawing Sheets

U.S. PATENT DOCUMENTS

| | | |
|---|---|---|
| 3,204,238 A | 8/1965 | Skellet |
| 3,323,126 A | 5/1967 | Malone et al. |
| 3,493,290 A | 2/1970 | Traub |
| 3,555,349 A | 1/1971 | Munz |
| 3,636,261 A | 1/1972 | Preston, Jr. |
| 3,636,551 A | 1/1972 | Maguire |
| 3,824,546 A | 7/1974 | Kawasaki et al. |
| 3,869,575 A | 3/1975 | Spitz et al. |
| 3,951,663 A | 4/1976 | Ross |
| 4,041,476 A | 8/1977 | Swainson |
| 4,130,832 A | 12/1978 | Sher |
| 4,159,536 A | 6/1979 | Kehoe et al. |
| 4,160,973 A | 7/1979 | Berlin, Jr. |
| 4,211,998 A | 7/1980 | Junginger et al. |
| 4,227,046 A | 10/1980 | Nakajima et al. |
| 4,231,019 A | 10/1980 | Junginger et al. |
| 4,270,048 A | 5/1981 | Liebing |
| 4,343,969 A | 8/1982 | Kellett |
| 4,348,553 A | 9/1982 | Baker et al. |
| 4,359,758 A | 11/1982 | Teacherson |
| 4,376,950 A | 3/1983 | Brown et al. |
| 4,408,277 A | 10/1983 | Cortellini et al. |
| 4,441,201 A | 4/1984 | Henderson et al. |
| 4,442,455 A | 4/1984 | Huignard et al. |
| 4,472,737 A | 9/1984 | Iwasaki |
| 4,489,396 A | 12/1984 | Hashimoto et al. |
| 4,493,050 A | 1/1985 | Hashimoto et al. |
| 4,507,750 A | 3/1985 | Frantz et al. |
| 4,566,031 A | 1/1986 | Kirk |
| 4,613,944 A | 9/1986 | Hashimoto et al. |
| 4,631,748 A | 12/1986 | Breedlove et al. |
| 4,644,492 A | 2/1987 | Murata |
| 4,652,976 A | 3/1987 | Fushimoto |
| 4,658,374 A | 4/1987 | Tanimoto et al. |
| 4,677,552 A | 6/1987 | Sibley, Jr. |
| 4,718,044 A | 1/1988 | Matsuyama |
| 4,749,353 A | 6/1988 | Breedlove |
| 4,769,846 A | 9/1988 | Simmons |
| 4,779,209 A | 10/1988 | Stapleford et al. |
| 4,852,170 A | 7/1989 | Bordeaux |
| 4,866,755 A | 9/1989 | Hashimoto |
| 4,882,681 A | 11/1989 | Brotz |
| 4,886,778 A | 12/1989 | Moon et al. |
| 4,892,863 A | 1/1990 | Agarwala |
| 4,894,177 A | 1/1990 | Starch |
| 4,896,150 A | 1/1990 | Brotz |
| 4,908,285 A | 3/1990 | Kushibiki et al. |
| 4,922,336 A | 5/1990 | Morton |
| 4,970,129 A | 11/1990 | Ingwall et al. |
| 4,984,177 A | 1/1991 | Rondel et al. |
| 4,989,177 A | 1/1991 | Morimoto et al. |
| 4,995,025 A | 2/1991 | Schultze |
| 4,996,120 A | 2/1991 | Smothers et al. |
| 4,998,236 A | 3/1991 | Henshaw |
| 4,999,234 A | 3/1991 | Cowan |
| 5,033,082 A | 7/1991 | Eriksson et al. |
| 5,054,082 A | 10/1991 | Smith et al. |
| 5,061,679 A | 10/1991 | Weeks, II |
| 5,065,317 A | 11/1991 | Hiramatsu et al. |
| 5,072,215 A | 12/1991 | Brotz |
| 5,075,850 A | 12/1991 | Asahioka et al. |
| 5,099,216 A | 3/1992 | Pelrine |
| 5,117,139 A | 5/1992 | Flom et al. |
| 5,122,951 A | 6/1992 | Kamiya |
| 5,126,317 A | 6/1992 | Agarwala |
| 5,140,640 A | 8/1992 | Graupe et al. |
| 5,150,294 A | 9/1992 | Tateno |
| 5,152,003 A | 9/1992 | Poch |
| 5,157,606 A | 10/1992 | Nagashima |
| 5,162,787 A | 11/1992 | Thompson et al. |
| 5,175,684 A | 12/1992 | Chong |
| 5,231,520 A | 7/1993 | Yoshinaga et al. |
| 5,268,839 A | 12/1993 | Kaji |
| 5,293,584 A | 3/1994 | Brown et al. |
| 5,295,068 A | 3/1994 | Nishino et al. |
| 5,319,629 A * | 6/1994 | Henshaw et al. ........... 369/103 |
| 5,327,506 A | 7/1994 | Stites, III |
| 5,353,335 A | 10/1994 | D'Urso et al. |
| 5,371,901 A | 12/1994 | Reed et al. |
| 5,375,164 A | 12/1994 | Jennings |
| 5,384,701 A | 1/1995 | Stentiford et al. |
| 5,388,146 A | 2/1995 | Morduch et al. |
| 5,406,622 A | 4/1995 | Silverberg et al. |
| 5,412,712 A | 5/1995 | Jennings |
| 5,418,113 A | 5/1995 | Yoshinaga et al. |
| 5,440,615 A | 8/1995 | Caccuro et al. |
| 5,455,706 A | 10/1995 | Brotz |
| 5,465,401 A | 11/1995 | Thompson |
| 5,475,733 A | 12/1995 | Eisdorfer et al. |
| 5,475,798 A | 12/1995 | Handlos |
| 5,481,645 A | 1/1996 | Bertino et al. |
| 5,497,319 A | 3/1996 | Chong et al. |
| 5,524,137 A | 6/1996 | Rhee |
| 5,539,705 A | 7/1996 | Akerman et al. |
| 5,546,538 A | 8/1996 | Cobbley et al. |
| 5,548,346 A | 8/1996 | Mimura et al. |
| 5,559,384 A | 9/1996 | Boland et al. |
| 5,576,953 A | 11/1996 | Hugentobler |
| 5,590,746 A | 1/1997 | Brotz |
| 5,607,310 A | 3/1997 | Cholley |
| 5,615,301 A | 3/1997 | Rivers |
| 5,635,918 A | 6/1997 | Tett |
| 5,663,740 A | 9/1997 | Brotz |
| 5,675,817 A | 10/1997 | Moughanni et al. |
| 5,684,616 A | 11/1997 | Brotz |
| 5,701,497 A | 12/1997 | Yamauchi et al. |
| 5,721,694 A | 2/1998 | Graupe |
| 5,724,526 A | 3/1998 | Kunita |
| 5,742,505 A | 4/1998 | Fushimoto et al. |
| 5,748,840 A | 5/1998 | La Rue |
| 5,758,023 A | 5/1998 | Bordeaux |
| 5,765,131 A | 6/1998 | Stentiford et al. |
| 5,774,537 A | 6/1998 | Kim |
| 5,784,456 A | 7/1998 | Carey et al. |
| 5,787,386 A | 7/1998 | Kaplan et al. |
| 5,794,218 A | 8/1998 | Jennings et al. |
| 5,828,990 A | 10/1998 | Nishino et al. |
| 5,848,389 A | 12/1998 | Asano et al. |
| 5,858,614 A | 1/1999 | Sato et al. |
| 5,868,576 A | 2/1999 | Maruta |
| 5,873,728 A | 2/1999 | Jeong |
| 5,875,422 A | 2/1999 | Eslambolchi et al. |
| 5,875,448 A | 2/1999 | Boys et al. |
| 5,879,837 A | 3/1999 | Yoshinaga et al. |
| 5,882,202 A | 3/1999 | Sameth et al. |
| 5,884,258 A | 3/1999 | Rozak et al. |
| 5,900,871 A | 5/1999 | Atkin et al. |
| 5,926,787 A | 7/1999 | Bennett et al. |
| 5,946,376 A | 8/1999 | Cistulli |
| 5,956,683 A | 9/1999 | Jacobs et al. |
| 5,963,892 A | 10/1999 | Tanaka et al. |
| 5,966,685 A | 10/1999 | Flanagan et al. |
| 5,970,460 A | 10/1999 | Bunce et al. |
| 5,983,186 A | 11/1999 | Miyazawa et al. |
| 5,987,401 A | 11/1999 | Trudean |
| 5,991,594 A | 11/1999 | Froeber et al. |
| 5,991,711 A | 11/1999 | Seno et al. |
| 5,991,726 A | 11/1999 | Immarco et al. |
| 5,995,932 A | 11/1999 | Houde |
| 5,999,618 A | 12/1999 | Reichard et al. |
| 6,002,997 A | 12/1999 | Tou |
| 6,006,182 A | 12/1999 | Fakhr et al. |
| 6,006,185 A | 12/1999 | Immarco |
| 6,021,387 A | 2/2000 | Mozer et al. |

| | | | |
|---|---|---|---|
| 6,044,342 | A | 3/2000 | Sato et al. |
| 6,070,139 | A | 5/2000 | Miyazawa et al. |
| 6,070,140 | A | 5/2000 | Tran |
| 6,078,566 | A | 6/2000 | Kikinis |
| 6,085,162 | A | 7/2000 | Cherny |
| 6,115,006 | A | 9/2000 | Brotz |
| 6,125,341 | A | 9/2000 | Raud et al. |
| 6,125,347 | A | 9/2000 | Cote et al. |
| 6,134,524 | A | 10/2000 | Peters et al. |
| 6,134,529 | A | 10/2000 | Rothenberg |
| 6,138,096 | A | 10/2000 | Chan et al. |
| 6,148,105 | A | 11/2000 | Wakisaka et al. |
| 6,157,727 | A | 12/2000 | Rueda |
| 6,167,366 | A | 12/2000 | Johnson |
| 6,175,819 | B1 | 1/2001 | Van Alstine |
| 6,178,248 | B1 | 1/2001 | Marash |
| 6,191,822 | B1 | 2/2001 | Smyers |
| 6,195,631 | B1 | 2/2001 | Alshawi et al. |
| 6,201,956 | B1 | 3/2001 | Tehan |
| 6,219,632 | B1 | 4/2001 | Schumacher et al. |
| 6,219,646 | B1 | 4/2001 | Cherny |
| 6,233,150 | B1 | 5/2001 | Lin et al. |
| 6,233,317 | B1 | 5/2001 | Homan et al. |
| 6,233,561 | B1 | 5/2001 | Junqua et al. |
| 6,240,392 | B1 | 5/2001 | Butnaru et al. |
| 6,243,669 | B1 | 6/2001 | Horiguchi et al. |
| 6,243,681 | B1 | 6/2001 | Guji et al. |
| 6,249,765 | B1 | 6/2001 | Adler et al. |
| 6,256,281 | B1 | 7/2001 | Tanaka et al. |
| 6,266,640 | B1 | 7/2001 | Fromm |
| 6,266,642 | B1 | 7/2001 | Franz et al. |
| 6,278,968 | B1 | 8/2001 | Franz et al. |
| 6,377,925 | B1 | 4/2002 | Greene, Jr. et al. |
| 6,385,586 | B1 | 5/2002 | Dietz |
| 6,501,966 | B1 | 12/2002 | Bareis et al. |
| 6,532,446 | B1 | 3/2003 | King |
| 6,594,220 | B1 | 7/2003 | Matsushita et al. |
| 6,594,347 | B1 | 7/2003 | Calder et al. |
| 6,673,142 | B2 | 1/2004 | Tofuku et al. |

FOREIGN PATENT DOCUMENTS

| | | |
|---|---|---|
| JP | 2000224500 | 8/2000 |
| JP | 2002042557 | 2/2002 |
| WO | WO9701243 | 1/1997 |

OTHER PUBLICATIONS

Associated Press, AskJeeves to Offer Phone Answer Service, USA Today Tech Report, 1 page, Nov. 8, 2000.

Lasky, Gotta Get the e-mail? Phone-Based Services Read Your e-mail and Let You Reply To It Too., 1 page, Nov. 13, 1998.

De Zwart et al., Speech Recognition SOC through Architectural Synthesis, Integrated System Design (ISD), 4 pages, Jun. 2000. http://www.isdmag.com/editorial/2000/applications0006.html.

Selected pages from: www.holoverse.com/frmail.htm, The 3D Beam Holographic & Volumetric Universe, 7 pages, Dec. 18, 2000.

www.geocities.com/CapeCanaveral/Lab/9018/, A 3D Volumetric Display Using a Rotating Helix, 2 pages, Dec. 18, 2000.

www.actuality-systems.com/product_main.htm, 3-D Display Product Development, 2 pages, Dec. 18, 2000.

Selected pages from: www.vdivde-it.de/felix/english_literature.html., 4 pages, Dec. 18, 2000.

Blundell, Volumetric Display Systems—Present and Future Developments, Computer Seminar IT Auditorium Building 31/3-005, 1 page, Wednesday Jun. 24, 2000.

Schwartz et al., Optimizing Dot Graphics for Volumetric Displays, IEEE Computer Graphics and Applications, 1 page, vol. 17, No. 3, May-Jun. 1997.

Selected page from www.neostech.com/neos/3d.htm., 3D Volumetric Display, Dec. 18, 2000.

Ashley et al., Holographic Data Storage, IBM Journal of Research Development, vol. 44, No. 3, pp. 341-368, May 2000.

Doege, D., Language Barriers Hinder Courts, Milwaukee Journal Sentinel (State Edition), 2 pages, Dec. 26, 2000.

Mumbru et al., Optically Programmable FPGA Systems, Caltech Center for Neuromorphic Systems Engineering (http://erc.caltech.edu/Research/Reports/mumbru1full.html), Dec. 23, 2000.

Sanford et al., A One-Megapixel Reflective Spatial Light Modulator System for Holographic Storage, IBM Journal of Research & Development, vol. 43, No. 3, pp. 1-9, Mar. 17, 1997.

Selected pages from: http://domino.research.ibm.com/comm/wwwr_thinkresearch.nsf/pages/projection196.html Sinclair, M., A New Twist on Image Projection, 5 pages, Jul. 19, 2004.

Selected pages from: http://www.eng.warwick.ac.uk/~espbc/courses/undergrad/lec8/foruier_lens.htm OEL Optical Engineering Laboratory, The Lens as a Fourier Transform System, 2 pages, Mar. 18, 2004.

Selected pages from: http://acept.la.asu.edu/PiN/rdg/polarize/polarize.shtml Patterns In Nature, Light and Optic, 4 pages, Mar. 18, 2004.

* cited by examiner

HOLOGRAPHIC SPEECH TRANSLATION SYSTEM AND METHOD

CROSS-REFERENCE TO RELATED APPLICATIONS

This is a continuation-in-part of United States patent application Ser. No. 10/061,843 filed on Jan. 31, 2002 now U.S. Pat. No. 6,978,240, the entire contents of which are incorporated herein by reference.

BACKGROUND OF THE INVENTION

Holographic data storage can offer a high-capacity storage alternative by storing information in the volume of a medium, and not just on the surface of the medium. In some types of holographic data storage, information can be stored as an optical interference pattern within a photosensitive or other optical material.

As described in "Holographic data storage" by Ashley et al., which is incorporated by reference herein, data can be stored as an optical interference pattern in a holographic storage medium by intersecting two coherent laser beams within the storage medium. The first laser beam, called the object beam, contains the information to be stored. The second laser beam, called the reference beam, is selected to be simple to reproduce, such as a collimated beam with a planar wavefront. The resulting optical interference pattern causes chemical and/or physical changes in the holographic storage medium in a manner known to those in the art. A replica of the interference pattern can be stored as a change in the holographic storage medium (e.g., a change in an absorption property, refractive index, or thickness of the photosensitive medium). When the stored interference pattern is illuminated with one of the two waves used to store the interference pattern, at least some of the light is diffracted by the stored grating in such a way that the other wave is reconstructed. As is also well known in the art, illuminating the stored interference pattern with the reference beam reconstructs the object beam, and vice versa.

A large number of interference patterns can be superimposed in the same piece of holographic storage medium and can be accessed independently, as long as each interference pattern (also referred to herein as a "frame" of data) is distinguishable by the direction or the spacing of the interference patterns. In some cases, such separation can be accomplished by changing the angle between the object and reference beams (i.e., "angle-multiplexed") or by changing the laser wavelength (i.e., "wavelength-multiplexed"). Any particular frame can then be accessed and read independently by illuminating the frame with the reference beam that was used to store that frame.

As used herein and in the appended claims, the term "frame" refers to a set of data that was stored as an interference pattern in a holographic storage medium using (1) an incident beam of light having a defined incidence angle, or (2) an incident beam of light having a defined wavelength. For example, a frame of an angle-multiplexed holographic storage medium can be stored as an interference pattern in the holographic storage medium using an object beam (e.g., a spherical wave) object beam and reference beam (e.g., a coherent plane wave, such as that from a laser). Superposition of the object beam and the reference beam at the holographic storage medium forms an interference pattern as described above. The data stored in that particular frame can then be read from the holographic storage medium by (1) illumination with the reference beam, which is diffracted by the stored interference pattern to reconstruct the original spherical wavefront of the object beam, (2) illumination with the object beam, which is diffracted by the stored interference pattern to reconstruct the original plane wave reference beam, or (3) a counter-propagating, or phase-conjugate, reference beam, which is diffracted by the stored interference pattern to reconstruct a phase-conjugate copy of the original object beam.

SUMMARY OF THE INVENTION

It is a principal goal of this invention to provide a speech translation system to replace the prior art method of speech translation utilizing data storage on hard disks or magnetic tapes by providing a new, primarily optical translation system apparatus and method utilizing holographic data storage which optical system functions at a significantly higher speed than prior art electronic data storage/retrieval systems.

It is a further object of this invention to provide an improved speech translation system for high speed word and sentence translation and for the transmittal of such translated speech utilizing holographic storage material technology for the storage of the words or phonemes of one or more languages.

Some embodiments of the present invention provide a speech translation system comprising a display upon which data corresponding to at least one spoken word of a user is displayed; a holographic storage medium having a plurality of frames oriented at different angles within the holographic storage medium, each frame having: a first portion carrying data representative of at least one word in a first language, and a second portion carrying data representative of at least one word in a second language, wherein the at least one word in the second language is a translation; a first laser positioned to direct a beam of light through the display and the holographic storage medium, at least one of the holographic storage medium and the first laser movable to direct the beam to different frames of the plurality of frames; and at least one detector positioned to receive light from the laser through the holographic storage medium; an output device by which translated speech is provided to a user; and a correlation detector coupled to the at least one detector and adapted to detect a match between the at least one spoken word upon the display and the data representative of at least one word in the first language in the first portion of a frame, the correlation detector responsive to detection of the match by sending the data representative of at least one word in the second language in the second portion of the frame to the output device.

In some embodiments of the present invention, a speech translation system is provided and comprises a display upon which at least one word spoken by a user can be displayed; a first holographic storage medium having a plurality of frames, each frame having data representative of at least one word in a source language; at least one first laser positioned to direct a first beam of light to the display to generate a first modified beam of light leaving the display and a second beam of light to the first holographic storage medium to generate a second modified beam of light leaving the first holographic storage medium, the first modified beam of light carrying information from the display, the second modified beam of light carrying information from the first holographic storage medium; at least one first detector positioned to receive the first modified beam of light and the second modified beam of light; and a correlation detector coupled to the at least one detector and adapted to identify a match between the information from the display and the information from the first holographic storage medium.

Other features and aspects of the invention will become apparent to those skilled in the art upon review of the following detailed description, claims and drawings.

Figure 1:
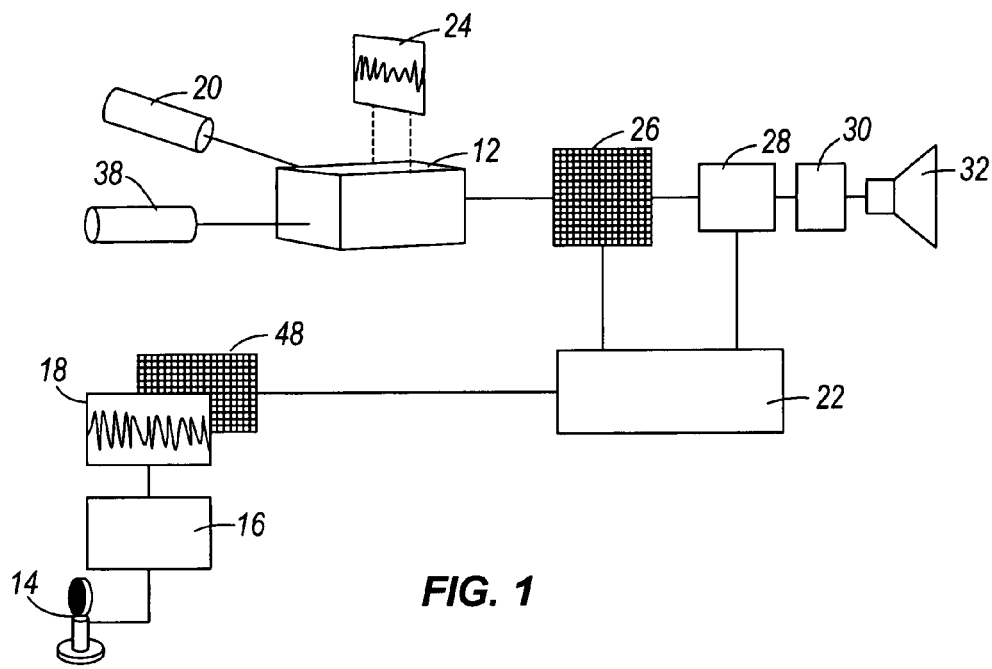
FIG. 1 illustrates a schematic diagram of an embodiment of a speech translation system according to the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings.

Further aspects of the present invention, together with the organization and manner of operation thereof, will become apparent from the following detailed description of the invention when taken in conjunction with the accompanying drawings, wherein like elements have like numerals throughout the drawings.

DETAILED DESCRIPTION

Holographic storage medium is well known in the art in which a large plurality of images can be stored in distinct angular planes which are accessed by a object and reference beams for retrieval thereof. As described above, in one of its simplest forms the system of this invention can provide a plurality of accessible image frames within the holographic storage material acting as a holographic data storage medium. An object beam and a reference beam projected into the holographic storage material can access and detect selected frames. In some embodiments of the present invention, a data base of multiple holographic language word wave form frames can be created within the holographic storage material. Each wave form frame can depict the wave from or the selected depiction of a character, phonemes, words, phrases, sentences or any other segment of speech, code, text or pictogram; and the position of that frame containing each depiction, such as of a word, can also be stored in a storage device. Hereinafter, any reference to wave form shall be considered to include any form of depiction of a word, phrase or the like in a frame. Further, any reference to "word" shall be considered to include all other speech segments or depictions as described above. Incoming speech can be parsed into word or phrase segments, and its wave form can be graphically displayed on a pixilated input device such as a liquid crystal display (LCD) screen or equivalent. A detector, such as a charged coupled device (CCD), can be positioned to detect the wave form that is displayed on the input device. A comparator device can receive such wave form. A second detector can be positioned to detect the discrete wave forms scanned within such holographic storage material and to direct such information also to such comparator device. When a match is detected, the comparator sends the position of that identified matching frame in the holographic storage material to a position location storage device which in one embodiment can contain a recording of the sound of all words in whatever desired other language into which the first language is to be translated, wherein each word corresponds to a frame position. The word associated with that selected frame can then be transmitted to a speaker device in a desired location where it can be broadcast to be heard.

In some embodiments of the present invention, the speech translation system can be entirely optical in nature. For example, each stored frame can contain a portion having the first language word depicted in its wave form and another portion having at least one second language wave form of a second language corresponding in meaning to the first language wave form. In some embodiments, a microphone can be provided into which a user speaks in a first language. That language can be processed through a speech parser, and the words can be displayed in a wave form on, for example, a LCD data display which displays such wave form. A correlation detector observes the wave form of the spoken speech segment and compares that wave form to the plurality of scanned wave form frames as they become recognized to the correlation detector by the action of a reference beam scanning the holographic storage medium. When a match is detected between the wave form from the spoken word in the first language, the image of the matching scanned frame is scanned to detect the portion thereof which contains the wave form of the word in the second language. The second language wave form can then be transmitted optically to an image detector, wherein that wave form is processed by a digital audio player to produce the sound of that wave form through a speaker device which produces an audible version of the initially spoken word but in the second language.

The scanning process word-by-word can be accomplished extremely quickly through constant scanning of the reference beam through the holographic storage medium until a match with the first speech wave form is found. The second desired speech wave form can then be projected to a CCD detector screen or other machine vision device where it can be recognized by a system that can store such data and transmit an audio representation of the wave form relating to the initial spoken word but of the second language depicted in the frame selected. Multiple other language can be stored on each wave form with the first language so that the image capture circuitry can be adapted to pick up the frame segment of the desired language into which the initially spoken language is to be translated. The translations can be sent back to the same location as that of the microphone, or they can be transmitted to remote locations as would be required in a telephone conversation where instantaneous translation of a user's speech is desired. A similar system can be provided utilizing a microphone at the remote second location for responsive speech to be translated and heard back at a first location, or the second user at the remote location can use the same translating system as the initial speaker for his language to be translated. Alternatively, another translating system can be used that is separated from the first translating system. Both speakers, if they are at the same location, can utilize the same microphone and speaker device as long as the system is directed as to what is the language of the received spoken language and into what language it is to be translated.

FIG. 1 illustrates a schematic diagram of an embodiment of the present invention, utilizing a holographic storage material 12 which contains a plurality of image frames 24 depicted for illustrative purposes only above material 12 but which is actually within holographic storage material 12, with a wave form on frame 24 corresponding to one word or phrase of the spoken speech. The user's words in a first language are detected by microphone 14 and pass through a parsing circuit 16 where they are logically parsed into discrete wave forms representing such words. The wave forms are individually and sequentially displayed on a pixilated input device, such as a liquid crystal display (LCD) 18. A first detector array 48, such as a CCD, senses the wave from and sends that image to a correlation detector 22. At the same time a second detector array 26 senses the stored images of each frame in holographic storage material 12 as it is scanned by reference beam 20 from object beam 38 and also directs those images to correlation detector 22 where the image of the spoken speech wave form and the second stored speech wave form are compared. When a match is found, the position of that frame 24 within the holographic storage material 12 is sent to data base 28 where information is stored relevant to the position of that frame sufficient to produce synthesized speech in the second language into which the spoken speech is to be translated. For example, the stored data corresponding to the stored image frame 24 selected can produce a wave form of the word in the second language which passes through a digital audio player 30 and is broadcast from speaker device 32 where a listener can hear a translation in a second language of the spoken speech of the first speaker as such words are processed by the system of this invention.

Figure 2:
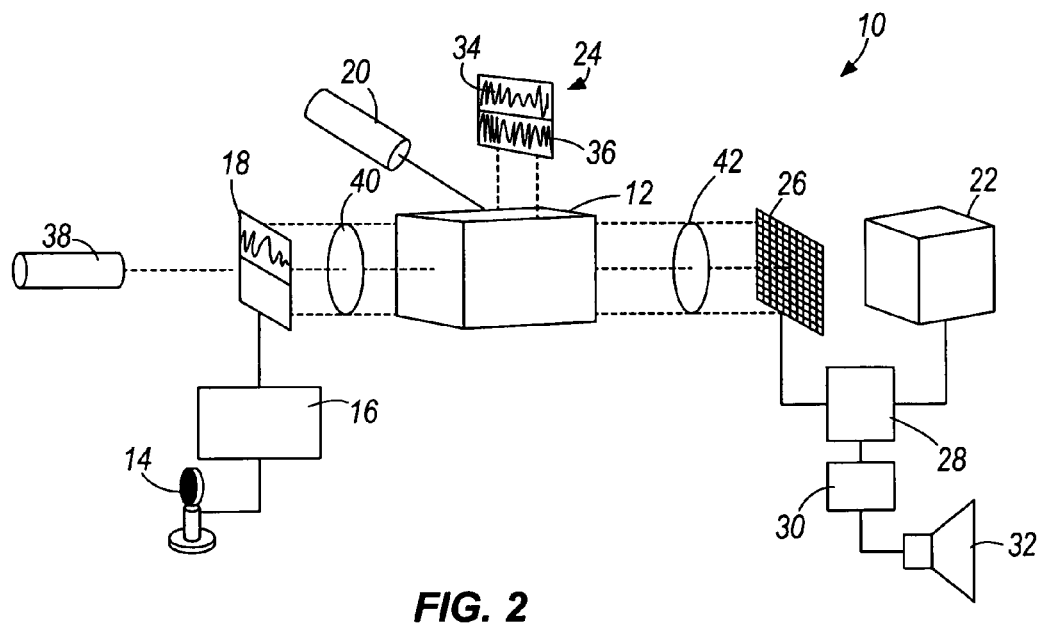
FIG. 2 illustrates a schematic diagram of another embodiment of a speech translation system according to the present invention.

FIG. 2 illustrates a schematic design of another embodiment of the language translation system 10 according to the present invention. In this embodiment, the translation occurs entirely within the optical system, which use can increase the translation speed substantially. Seen in this diagram is microphone 14 which receives the spoken speech and sends the resulting signal through a parsing circuit 16 where it is logically parsed into discrete wave forms, for example, representing words. The wave forms are individually and sequentially displayed, for example on an LCD screen 18, such that for each word a complex wave form appears on LCD screen 18. A holographic storage medium, such as for example a holographic storage crystal, is provided with a large plurality of different wave form images, each on a discrete frame, such as image frame 24 with each frame representing a different word which are all stored in various planes and which are illuminated by object beam 38 and a moving reference beam 20 disposed at angles to one another which object beam 38 and reference beam 20 usage are well known when used with holographic storage medium 12 for isolating a single image plane for the viewing thereof. Each image frame 24 is comprised of multiple speech wave forms such as depicted in image frame 24 shown, for purposed of illustration, above holographic storage medium 12 but which image frame in actuality would be located within medium 12. A correlation detector 22 is arranged to receive the images of the first language wave form of LCD 18 and any visible frame of the scanned speech wave forms within holographic storage material 12. When correlation detector 22 detects the same or similar wave form in section 34 of image frame 24 within the holographic storage material 12 as it is scanned by reference beam 20 as the speech sample display 18, a match has been made. On the speech sample image frame 24 that is designated as a match there is at least one second language wave form 36, and there could be other language wave forms. The selected second language wave form 36 is projected onto an image receiver 26 by object beam 38 which image receiver 26 can be a CCD image receiver or other machine vision device and that wave form is then read by a digital audio player 30 which reconstitutes that second language wave form into audible sound and broadcasts it through speaker device 32 where it is heard as a word in the second language into which the first language has been translated. Similar systems as that illustrated in FIGS. 1 and 2 can be provided for the translation of the speech of the second user who speaks the second language back to the first language of the first user so that simultaneous translation in real time can occur.

In the embodiment of the present invention illustrated in FIG. 2, each frame 24 has a first portion 34 in which is stored a speech segment in a first language (used for recognizing a speech segment spoken by a user and displayed on the display 18) and a second portion 36 in which is stored a speech segment that is a translation in a second language of the speech segment stored in the first portion 34 of the frame 24. Although the first and second portions of the frame 24 are illustrated as being co-planar within the holographic storage material 12, such a relationship between the portions of the frame 24 is not required. In other embodiments, the first portion 34 of one or more frames 24 is at a known angle with respect to the second portion 36 of such frames 24. Accordingly, when a laser beam is directed through the first portion 34 of a frame 24 (in order to determine whether a match exists between a speech segment spoken by a user and displayed on the display 18 and a speech segment stored in the first portion 34 of a frame 24), the translated speech segment is already known because it is located within the second portion 34 of the frame 24 at a known angle with respect to the first portion 34 of the frame 24. The second portion 34 of the frame 24 can be illuminated by the same laser beam (or part thereof) or another laser beam. The resulting beam of light exiting the second portion 34 of the frame 34 from the holographic storage material 12 can be received by the same image receiver 26 or a different image receiver connected to the correlation detector 22.

The system can also include additional apparatus for the reduction of ambient noise and for the storage of phrases as well as individual words for even faster translation of multiple words that can be matched to stored wave form samples of multiple words. The system of this invention relies on the fact that words when displayed in a wave form, even when spoken by different persons, will still substantially match the base wave form that is stored within the holographic storage material. The wave form produced and searched for can utilize the techniques of statistical high points corresponding to similar wave forms and can search not necessarily for exact wave form matches but for wave forms which conform to the pattern created when the first speech is converted into its wave form. The comparator can utilize the laser object beam and reference beam to quickly scan the holographic storage material to receive at the same time the object beam through the speech sample display to align the two-dimensional imagery of the speech sample display and the stored speech sample image. This comparison process can be achieved, for example, by comparing the intensity of the image such that the most reduction in light received might be accomplished when the speech sample wave form coincides and overlaps the stored speech sample wave form in the holographic storage medium. In some embodiments, a spatial Fourier transformation can be done on the intensity profile with an inverse Fourier transformation being performed on the images, including echo or shadow images of the wave forms, resulting in a correlation or convolution of the initial speech form data and the stored speech form data. When the correlation detector detects a very high correlation between the stored speech sample wave form and the wave form of the speech sample, a change in sensitivity to the data can be detected, and that frame on which the reference beam is directed can then be projected by the object beam with the portions thereof carrying wave form speech data in the second language directed onto and picked up by image receiver 26.

In order to reduce the amount of scanning necessary for the object beam and reference beam which, if they are lasers, can have a relatively narrow focus in some embodiments, beam expanders can be used to spread the laser light intensity over a wider area, such as first apodizer 40 and second apodizer 42. The first apodizer 40 can also be positioned between the laser producing object beam 38 and the liquid crystal display 18 in order to create a homogenization of the laser beam to produce a uniform light intensity on the liquid crystal display 18, thereby acting as a beam expander such that the light covers the liquid crystal display frame 18. Also, collimators can be utilized to control the beam's convergence and divergence as desired, along with polarizers to yield the optimum interaction of the light beam with the stored interference patterns in the holographic storage medium.

In some cases, frequency shifting means or multiple lasers producing different wave length light beams can be utilized, especially when recordings are created with multifrequencies. For example, spectrum tunable lasers can be used in some embodiments, and can be controlled in any conventional manner to change the frequency of light directed to the holographic storage medium 12. An example of a broad spectrum tunable laser is a lithium fluoride crystalline tunable laser, although other types of spectrum tunable lasers exist and can instead be used.

Well known light beam-directing scanners can also be used to cause the light to move across the liquid crystal display at various desired angles. In some embodiments, the light beam can be directed along a fixed axis, while the holographic storage medium is moved to place itself at various angles to the light beam. In some alternate embodiments, both the light beam and holographic storage medium can be moved simultaneously in order to increase the speed of access or increase the number of frames that can be stored in the holographic storage medium.

Basically, the image receiver 26 can be, for example, a camera since it must view and be able to record the selected wave form within the plane in the holographic storage medium that has been made visible by the reference beam and object beam to view its reconstructed image. The object beam can exit the holographic storage medium, carrying with it the shadow, reflected or interference image of the selected stored image wave form. The wave form is then picked up by the image receiver 26 and directed through the digital audio player 30, which reconstitutes such wave form into audible speech.

In some embodiments, because of the light intensity reduction which occurs when a match of the speech wave form and stored wave form is made, correlation detector 22 in such embodiments can be as simple a device as a light intensity detector to indicate a match when the light intensity drops due to matching patterns of the speech wave form and stored wave form blocking more light when they coincide or when such light changes to predetermined level. In other embodiments, the match of the speech wave form and stored wave form may cause an increase in light intensity.

When searching for phrases, idiomatic expressions, particular jargon and dialect, and contextual information can be added by known computer programs to direct the laser object and reference beams to particular angles within the holographic storage medium where such phrases and unique expressions can be stored.

The storage of multiple languages within one or more holographic storage media or crystals also allows for the translation of speech in one language into multiple languages simultaneously if there are multiple listeners who are conversantes in different languages. One or more holographic storage media can form libraries where speech signals can be stored as wave forms on holographic frame templates arranged in the varied planes of the holographic storage medium.

Figure 3:
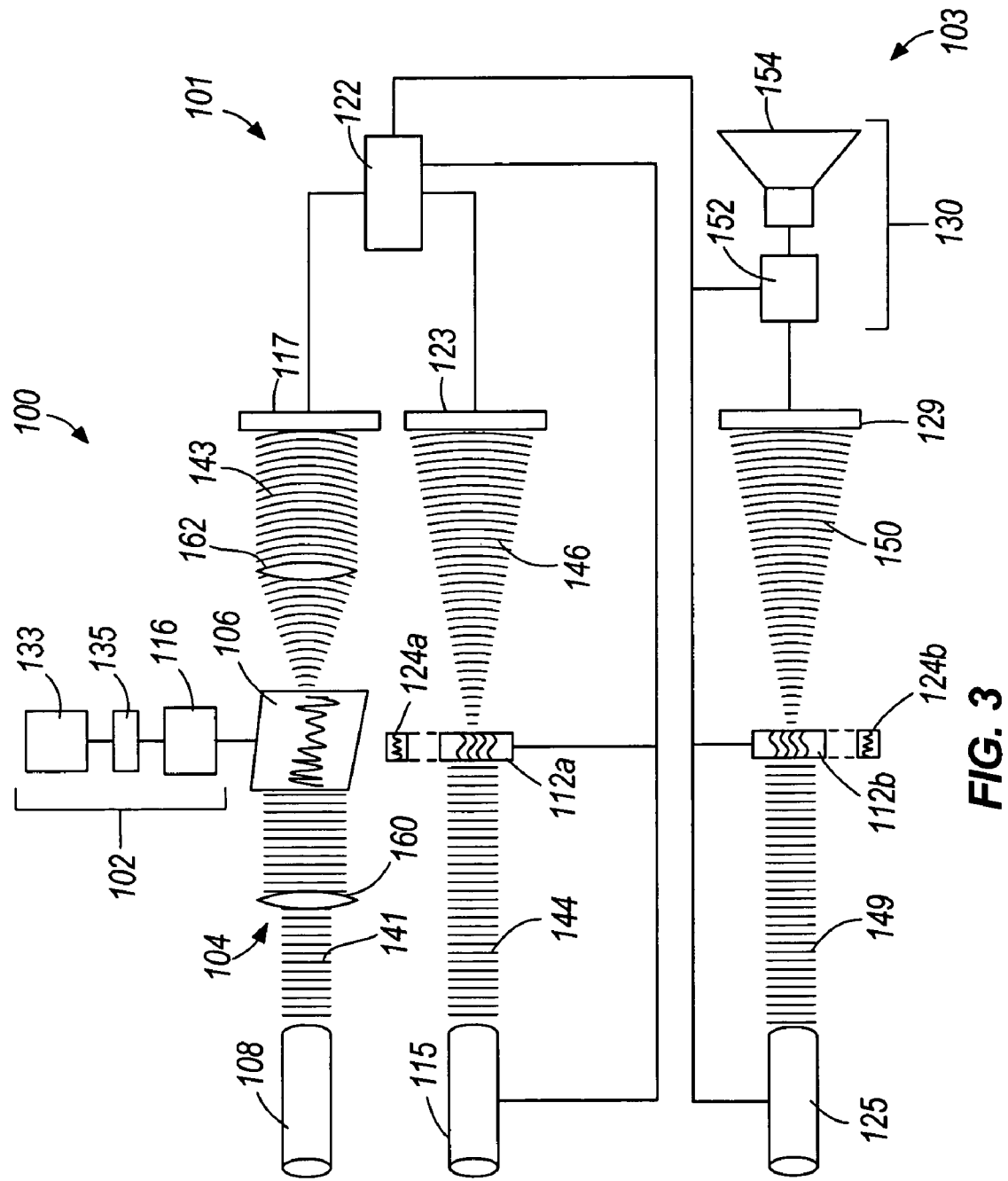
FIG. 3 illustrates a schematic diagram of another embodiment of a speech translation system according to the present invention, the speech translation system including a speech recognition assembly and speech translation assembly.
Figure 4:
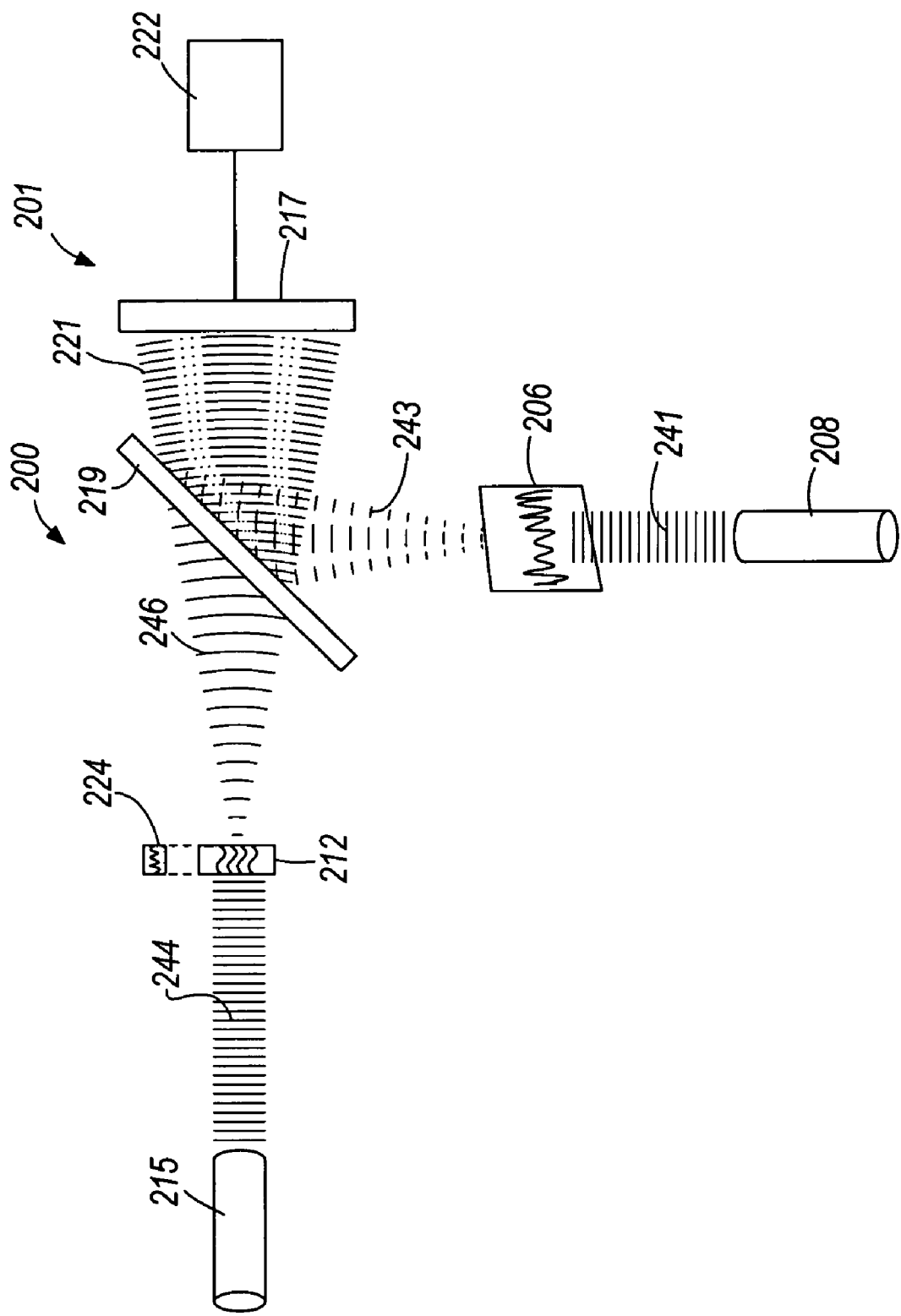
FIG. 4 illustrates another embodiment of the speech recognition assembly of FIG. 3.
Figure 5:
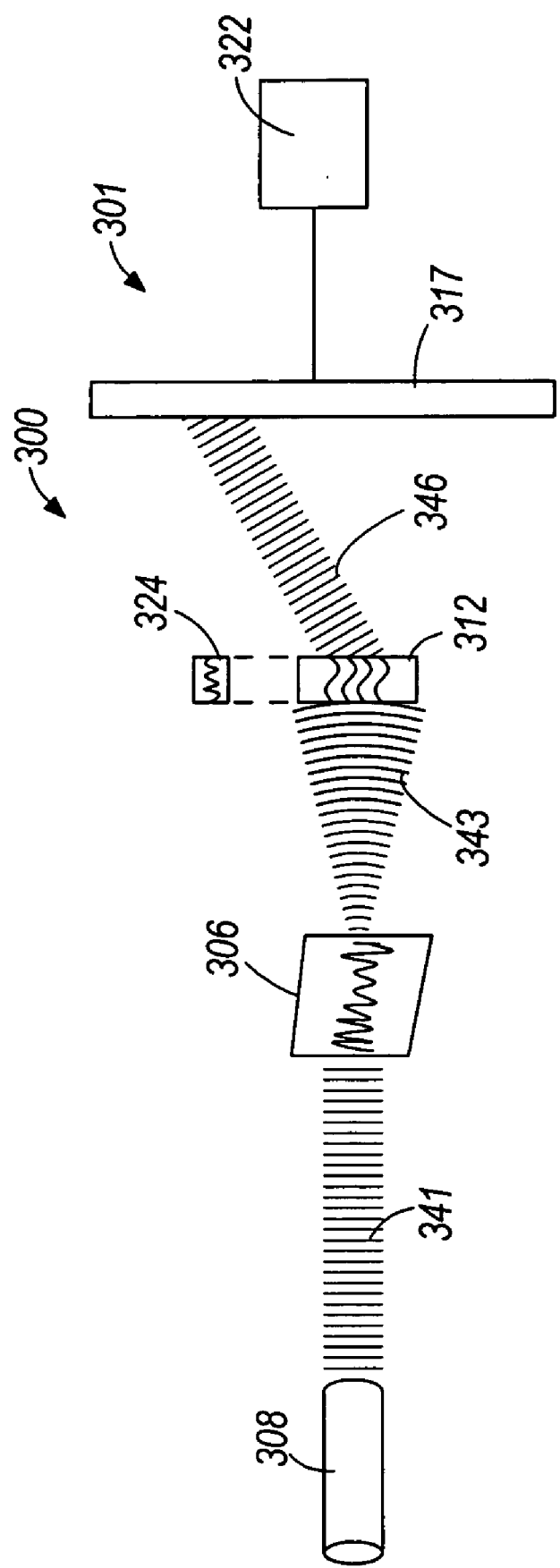
FIG. 5 illustrates another embodiment of the speech recognition assembly of FIG. 3.

Because a frame of data can be stored in a holographic storage medium as an optical interference pattern, illuminating the stored pattern with the reference beam that was used to store the data will reconstruct the object beam that contains the stored information, and vice versa. These holographic storage and retrieval principles are well known to those skilled in the art and are not therefore described further herein. FIGS. 3-5 further illustrate the use of such concepts in conjunction with additional speech translation systems according to embodiments of the present invention.

FIG. 3 illustrates a speech translation system 100 according to an embodiment of the present invention. The speech translation system 100, as illustrated in FIG. 3, includes a speech recognition assembly 101 and a speech translation assembly 103.

The speech recognition assembly 101 illustrated in FIG. 3 includes a speech parsing assembly 102, an optics assembly 104, a display 106, a first laser 108, a first holographic storage medium 112a including a plurality of frames 124a, a second laser 115, a first detector 117, a second detector 123, and a correlation detector 122.

The speech translation assembly 103 illustrated in FIG. 3 includes a third laser 125, a second holographic storage medium 112b including a plurality of frames 124b, a third detector 129, and an output device 130.

In some embodiments, the speech parsing assembly 102 includes a microphone 133 for receiving speech spoken by a first user, a signal processor 135 for processing the vocal signal received by the microphone 133, and a parsing circuit 116 for parsing the language spoken by the first user into one or more characters, phonemes, words, phrases, sentences or any other segments of speech, code, text or pictograms, as described above.

The microphone 133 can be of any conventional type, such as magneto-dynamic, condenser, ribbon, electret, and other types of microphones. The microphone 133 can be an ear microphone, a free-standing or overhead microphone, a headset microphone, or can take any other conventional form desired. In some embodiments, the microphone 133 is a parabolic, ear, or bone-conductance microphone, used for the capability of reducing ambient noise levels received by the microphone. Parabolic microphones can be used in non-portable applications, such as in office or boardroom environments, while ear or bone-conductance microphones can be used in portable applications in which the user is mobile. In some embodiments of the present invention, the microphone 133 is part of a portable communications device such as a mobile telephone, a wireless PDA, and the like. In these and other embodiments, the microphone 133 can be part of a headset worn by a user.

The signal processor 135 can be coupled to the microphone 133 in any manner to receive sound signals therefrom. By way of example only, the microphone 133 can be connected to the signal processor 18 by suitable electrical leads, contacts, wiring, fiber optics, optical cables, and the like, can be wirelessly connected thereto via a conventional wireless transmitter and receiver, or can be connected thereto in any combination of such connections. In some embodiments, wires run from the microphone 133 directly to the signal processor 18. In other embodiments, the microphone 133 is located on the same device (e.g., a base, computer, etc.) that includes the signal processor 18. In some embodiments, the microphone 133 is directly or indirectly connected to one or more telephone networks (e.g., an electric telephone system, a fiber optic cable system, and the like), which are in turn connected to the signal processor 18. The telephone networks can include satellite networks, LAN lines, combinations thereof, or any other telephone communications system desired.

The signal processor 135 can receive analog or digital sound signals from the microphone 133. In some embodiments, the signal processor 135 includes an analog-to-digital converter (in cases where the sound signals have not already been digitized prior to reaching the signal processor 135), and can include one or more amplifiers, filters, and other signal processing devices. A signal amplifier (digital or analog, or in appropriate cases, mixed signal amplifiers) can be used to amplify the sound signals. The signal processor 135 can also include a spectrum analyzer to transform the time wave form into a spectrum for processing in a conventional manner. Alternatively, the signal processor can simply output the amplified time wave forms (in digital or in analog format). The resulting processed sound signal can then be transmitted to the display 106.

The display 106 can depict a wave form of the parsed and processed speech sound signal received from the speech parsing assembly 102. The display 106 can be directly or wirelessly coupled to the speech parsing assembly, as is well-known to those of ordinary skill in the art. In some embodiments, the display 106 includes a spatial light modulator, such as a liquid crystal display ("LCD"). In other embodiments, the display 106 includes a spatial light modulator, such as an array of lasers, with some lasers turned on and some turned off to create a wave form of the speech signal spoken by the first user.

In embodiments employing a LCD display 106, the liquid crystal cells can be made of black and white, grayscale, or full-color pixels. The liquid crystal cells can form images on the display 106 as a whole, or the data can be depicted in any conventional form on the display 106 in any desired manner. In some embodiments, for example, the data is provided to the display 106 in a series of signals which fill part or all of the display 106 in raster form (such as by filling the cells of each row in the display 106 with data by serial or parallel data transfer and by moving the data in each completed row to a lower row by parallel data transfer). Other manners of inputting data into correct locations on the display 106 are possible, are well-known to those skilled in the art, and fall within the spirit and scope of the present invention.

Data corresponding to sounds detected over a desired length of time are transmitted to and depicted on the display 106. Alternatively, the speech parsing assembly 102 can parse or otherwise segment the speech received by the microphone 133 into words, phrases, or other portions of speech for transmission to the display 106. The first laser 108 can comprise an argon-ion laser or any other laser known to those in the art. The first laser 108 is positioned to irradiate the display 106 with a first beam of light 141 to form a first modified beam of light 143 emitted from the display 106. That is, the first beam of light 141 from the first laser 108 is modified by the wave form representing the speech signal from the first user that is displayed on the display 106. The first modified beam of light 143 can be further modified by one or more optical modifiers, as described above. The first detector 117 is positioned to intercept and receive the first modified beam of light 143. Similar to the detectors described above with respect to other embodiments of the present invention, the first detector 117 can include a charge coupled device (CCD). Any other type of photodetector can instead be used, all of which fall within the spirit and scope of the present invention. By way of example only, a photosensitive Micro-Electro-Mechanical System (MEM) can be used in place of the CCD in the illustrated embodiment of FIG. 3.

The first detector 117 receives the first modified beam of light 143, which is cast upon the first detector 117 in a form that can be defined at least in part by varying intensity and/or wavelength in different parts of the first detector 117. This form is detected by the first detector in a conventional manner, and can be transmitted to a correlation detector 122 (described in greater detail below).

The optics assembly 104 illustrated in FIG. 3 can include a first optical modifier 160 and/or a second optical modifier 162. The optics assembly 104 is optional, but can be useful in optimizing the first beam of light 141. Each of the first and second optical modifiers 160, 162 can include at least one of an apodizer, a beam splitter, a collimator, a lens, a shutter for blocking a portion of the beam of light, and the like. The first and second optical modifiers 160, 162 can be positioned at any point in the system to modify the beam of light radiating from the first laser 108. The first and second optical modifiers 160, 162 can be positioned serially or in parallel to modify the beam of light from the first laser 108 in any manner desired to improve speech translation performance of the system 100. By way of example only, the first optical modifier 160 is illustrated in FIG. 3 as being located between the first laser 108 and the display 106, and the second optical modifier 162 is illustrated as being located between the display 106 and the first detector 117. Any number of these and other types of optical modifiers can be located at these and/or other locations in the speech translation system 100. The first and second optical modifiers 160, 162 are shown by way of example only.

The second laser 115 is positioned to irradiate the first holographic storage medium 112a with a second beam of light 144 to form a second modified beam of light 146 emitted from the first holographic storage medium 112a. Specifically, the first beam of light 144 from the second laser 115 can by modified by one or more optical modifiers (not shown) as described above, irradiates a frame 124a of the first holographic storage medium 112a, and is modified by the interference pattern stored in the frame 124a to form the second modified beam of light 146. The second modified beam of light 146 can be further modified by one or more optical modifiers (not shown), as described above. The second modified beam of light 146, irradiates the second detector 123.

The holographic storage media 112a, 112b (and other holographic storage media described below) can be formed of any conventional holographic material. By way of example only, the holographic storage media 112a, 112b can comprise photosensitive or photoresistive material. By way of example only, either or both holographic storage media 112a, 112b in the illustrated embodiment of FIG. 3 can comprise an Fe-doped lithium niobate ($LiNbO_3$) crystal, organic volume phase holographic storage recording media, and the like. Other types of holographic material can be used, and are well known to those in the art.

The first holographic storage medium 112a can be wavelength-multiplexed or angle-multiplexed. As used herein and in the appended claims, the term "angle-multiplexed" refers to data that has been superimposed yet can be accessed independently within the same volume of a holographic storage medium by changing the incidence angle of an incident beam of light. As used herein and in the appended claims, the term "wavelength-multiplexed" refers to data that has been superimposed yet can be accessed independently within the same volume of a holographic storage medium by changing the wavelength of an incident beam of light.

As a result, each frame 124a of the first holographic storage medium 112a corresponds to an individually-stored portion of data that can be accessed by a specific incidence angle or wavelength of the second beam of light 144.

In embodiments employing an angle-multiplexed first holographic storage medium 112a, the second laser 115 can access different frames of data in the first holographic storage medium 112a by changing the incident angle of the second beam of light 144 with respect to the first holographic storage medium 112a. The incident angle of the second beam of light 144 can be changed by moving the second laser 115 and/or by moving the first holographic storage medium 112a in any manner. For example, in some embodiments, the first holographic storage medium 112a can be spun or moved in any other manner with respect to the second beam of light 144 by being suspended from above or below, by being rotatably supported from a side of the first holographic storage medium 112a, and the like. Spinning the first holographic storage medium 112a with respect to the second laser 115 and the second beam of light 144 and/or moving the second laser 115 and the second beam of light 144 with respect to the first holographic storage medium 112a changes the incident angle of the second beam of light 144 as it irradiates the first holographic storage medium 112a, allowing fast retrieval of data stored in the plurality of frames 124a of the first holographic storage medium 112a.

As another example, the second laser 115 can be moved by being coupled to one or more conventional solenoids, motors, piezoelectric driving elements or other actuators. In some embodiments, the second laser 115 can be rapidly tilted or moved relative to the first holographic storage medium 112a to change the incident angle of the second beam of light 144. In these and other embodiments, the incident angle of the second beam of light 144 can be changed using a beam directing device (not shown), as is well-known to those in the art. For example, a beam directing device 146 can include at least one of a prism, a galvanometrically actuated scanner, a mirror, movable fiber-optic lines and other fiber-optic elements (with or without one or more actuatable and non-actuatable lenses), piezoelectric optical elements and other electro-optical elements, the like.

In the illustrated embodiment of FIG. 3, the second beam of light 144 acts as the reference beam for the stored interference pattern in a frame 124a in the first holographic storage medium 112a, and the second beam of light 144 is diffracted by the interference pattern in the frame 124a to reconstruct the object beam that was used to store the interference pattern in the frame 124a (i.e., the second modified beam of light 146).

As described above, the first detector 117 is positioned to intercept and receive the first modified beam of light 143 (i.e., the first beam of light 141 after it has passed through the display 106), while the second detector 123 is positioned to intercept and receive the second modified beam of light 146 (i.e., the second beam of light 144 after it has passed through a frame 124a in the first holographic storage medium 112a). As the incident angle of the second beam of light 144 (i.e., the reference beam) is changed by any of the methods described above, the second modified beam of light 146 (i.e., the reconstructed object beam) changes, based on the interference pattern corresponding to each frame 124a of the first holographic storage medium 112a illuminated as the plurality of frames 124a is scanned by the second beam of light 144. The images detected by the first detector 117 and the second detector 123 can then be compared by the correlation detector 122. The correlation detector 122 can include a program that is run by a processor or CPU (not shown), or the correlation detector 122 can include a hardware unit capable of comparing the images of the first and second detectors 117, 123 in any conventional manner. The correlation detector 122 should not be limited to either a particular software program or an arrangement of hardware elements, as it is generally understood that such a correlation can be performed in a variety of ways, using a variety of combinations of software and/or hardware. Thus, the structure and operation of the correlation detector 122 is not described in greater detail herein.

By receiving data representative of a word, phrase, or other information in a first language via the first detector 117 and comparing such data to data received from the various frames 124a in the first holographic storage medium 112a scanned by the second laser 125, the correlation detector 122 can recognize the word, phrase, or other information in the first language. As will now be described, the correlation detector 122 can then control the speech translation assembly 103 to determine the translated language that corresponds to the recognized word, phrase, or other information and that will be output by the output device 130.

The third laser 125 in the illustrated embodiment of FIG. 3 is positioned to irradiate the second holographic storage medium 112b with a third beam of light 149 to form a third modified beam of light 150 emitted from the second holographic storage medium 112b. The third beam of light 149 from the third laser 125 is modified by the stored interference pattern corresponding to a frame 124b of the second holographic storage medium 112b to reconstruct the corresponding object beam of the stored interference pattern (i.e., the third modified beam of light 150). The third beam of light 149 and/or the third modified beam of light 150 can be further modified by one or more optical modifiers, as described above. The third detector 129 is positioned to intercept and receive the third modified beam of light 150.

In a manner similar to the relationship between the second laser 115 and the first holographic storage medium 112a described above, the third laser 125 and/or the second holographic storage medium 112b can be moved to change the incident angle of the third beam of light 149 with respect to the second holographic storage medium 112b, thereby accessing different frames 124b in the second holographic storage medium 112b. The information that is carried by the third modified beam of light 150 can correspond to a wave form of a spoken speech segment (e.g., a word, phrase, or other portion of spoken speech). The third modified beam of light 150 is then received and detected by the third detector 129 and transmitted to the output device 130. In some embodiments, the output device 130 include a digital audio player 152 and a speaker 154, as illustrated in FIG. 3. In some embodiments, the digital audio player 152 can include a MIDI player, although any other type of digital audio player can instead be used as is well known to those in the art.

In some embodiments, the first holographic storage medium 112a and the second holographic storage medium 112b have corresponding frames 124a and 124b, such that a frame 124a includes the wave form of a spoken speech segment in a first language and a frame 124b includes the translation of the spoken speech segment of frame 124a in a second language. Accordingly, when the speech recognition assembly 101 determines the address in the first holographic storage medium 112a of the frame 124a that matches the spoken speech segment spoken by a first user and displayed in the display 106, the correlation detector 122 can control the speech translation assembly 103 such that the frame 124b in the second holographic storage medium 112b having the corresponding address as the frame 124a in the first holographic storage medium 112a is illuminated by the third laser 125. In this manner, the third modified beam of light 150 carrying the translation is intercepted by the third detector 129 and is sent to the output device 130.

For example, the second laser 115 and/or the first holographic storage medium 112a can be moved with respect to one another in order to scan multiple frames 124a in the first holographic storage medium 112a until the correlation detector 122 detects a match between data representative of a word, phrase, or other information in a first language received via the first detector 117 and data from a frame 124a in the first holographic storage medium 112a. Upon determining that a match has occurred, the correlation detector 122 can use the position information of the second laser 115 and/or the first holographic storage medium 112a (connected to or otherwise in communication with the correlation detector 122) to retrieve a corresponding translation stored in the second holographic storage medium 112b. In this regard, the position information of the second laser 115 and/or the first holographic storage medium 112a can correspond to a relative position of the third laser 125 and the second holographic storage medium 112b (either or both of which can be connected to or otherwise be in communication with the correlation detector 122). Using this information, the correlation detector 122 can directly or indirectly position the third laser 125 and/or the second holographic storage medium 112b so that the frame 124b in the second holographic storage medium 112b is properly aligned to produce the third modified beam of light 150 carrying the corresponding translated speech segment.

In some embodiments, the first beam of light 141, the second beam of light 144 and the third beam of light 149 can be produced by one laser (or less than three lasers) split or otherwise modified to form three independent beams of light. In some embodiments, the first modified beam of light 143, the second modified beam of light 146 and the third modified beam of light 150 can all be intercepted and received by one detector, or by less than three dedicated detectors 117, 123, 129 as shown in FIG. 3. For example, the first modified beam of light 143 can be intercepted and received by a first portion of one detector, the second modified beam of light 146 can be intercepted and received by a second portion of the same detector, and so forth.

In some embodiments, the speech translation assembly 103 is distinct and separate from the speech recognition assembly 101, as shown in FIG. 3. In other embodiments, the speech translation assembly 103 can use elements or components of the speech recognition assembly 101. For example, the first holographic storage medium 112a can include a first set of frames 124a that correspond to spoken speech segments of a first language and a second set of frames 124b that correspond to spoken speech segments of a second language. In such embodiments, the first set of frames 124a and the second set of frames 124b can be stored at a certain angle of incidence with respect to one another in the first holographic storage medium 112a. The second beam of light 144 can be split in any conventional manner to form the second beam of light 144 and the third beam of light 149 such that the second beam of light 144 will illuminate the first set of frames 124a and the third beam of light 149 will simultaneously illuminate the corresponding second set of frames 124b in the same holographic storage medium 112a. This can be done with one laser (e.g., the second laser 115) or two lasers (e.g., the second laser 115 and the third laser 125), as is understood by one having ordinary skill in the art. As another example, the second beam of light 144 can be split in any conventional manner to form the second beam of light 144 and the third beam of light 149 such that the second beam of light 144 will illuminate the first set of frames 124a in the first holographic storage medium 112a while the third beam of light 149 illuminates a corresponding second set of frames 124b in another holographic storage medium (each frame in the corresponding set of frames 124b having a set or otherwise known angular position with respect to the corresponding frames 124a in the first holographic storage medium 112a).

In both examples just described, once the correlation detector 122 determines that a match has been made between a spoken speech segment (e.g., received by the first detector 117) and a speech segment stored in a frame 124a of the first holographic storage medium 112a, the translated speech segment can be immediately retrieved by a laser (e.g., the third laser 125 or a beam split from the second laser 115 or another laser). The laser can illuminate another portion of the same frame 124a in order to retrieve a corresponding translated speech segment from the other portion of the same frame 124a. Alternatively, the laser can illuminate another frame in the first holographic storage medium 112a oriented at a known angle with respect to the frame 124a for this same purpose, or can illuminate a frame at a known corresponding orientation in another holographic storage medium (e.g., the second holographic storage medium 112b) for this same purpose. Because the laser beam illuminating the translated speech segment data can be powered simultaneously with the laser beam illuminating the recognized speech segment data, the detectors corresponding to these beams can operate simultaneously. Therefore, in some embodiments the translated speech segment can be received at a corresponding detector 123 (or detector portion) at substantially the same time as or shortly after the recognized speech segment is received at a corresponding detector 129 (or detector portion).

By simultaneously irradiating a first set of frames 124a and a second set of frames 124b in the same or different holographic storage medium (e.g., holographic storage medium 112*a*, or holographic storage medium 112*a* and another holographic storage medium having corresponding frames with known positions relative to the frames 117 in the first holographic storage medium 112*a*), speech translation can occur simultaneously with speech recognition. For example, the third detector 129 can simultaneously intercept and receive the third modified beam of light 150 as the second detector 123 is intercepting and receiving the second modified beam of light 146. The correlation detector 122 can then control the communication between the third detector 129 and the digital audio player 152 to determine which third modified object beam of light 150 should be played and output to the speaker 154 (i.e., which third modified object beam 150 corresponds to second modified object beam of light 146 matching the first modified beam of light 143).

In embodiments employing only the first holographic storage medium 112*a* for storing speech segments of both the first language and the second language (i.e., having the first and second set of frames 124*a*, 124*b* as described above), the second modified beam of light 146 corresponds to wave forms of speech segments of the first language and the first set of frames 124*a*, and the third modified beam of light 150 corresponds to wave forms of speech segments of the second language and the second set of frames 124*b*. The second modified beam of light 146 and the third modified beam of light 150 can both be intercepted and received by the same or different detectors. For example, the second modified beam of light 146 can be intercepted and received by a first portion of a detector, and the third modified beam of light 150 can be intercepted and received by a second portion of the same detector. As a result, the second set of frames 124*b* that correspond to speech segments of a second language and the desired translation can be stored in the same holographic storage medium as the first set of frames 124*a* of the first language or in a second holographic storage medium 112*b*, as illustrated in FIG. 3. In addition, the second set of frames 124*b* can be illuminated by the third beam of light 149, which can be produced by the same or a different laser as the second beam of light 144. Furthermore, the third modified beam of light 150 that carries the information of the second set of frames 124*b* can be intercepted and received by the same or different detector as that of the second modified beam of light 146.

In some embodiments, the data stored as an interference pattern in the second set of frames 124*b* of the speech translation assembly 103 can include wave forms of a speech segment of a second language (i.e., the desired translation language), or an icon or symbol that carries information that can be used and accessed by a processor coupled to the speech translation assembly 103. For example, the data stored as a frame 124*b* can include an icon or symbol that corresponds to an address within a database that corresponds to a stored wav file or to sound data stored in any other form, which can be accessed and played by the digital audio player 152, and output to the speaker 154.

FIG. 4 illustrates a speech translation system 200 according to another embodiment of the present invention. The speech translation system 200 illustrated in FIG. 4 shares many of the same elements and features described above with reference to the speech translation system 100 of FIG. 3. Accordingly, elements and features corresponding to elements and features in the speech translation system 100 are provided with the same reference numerals in the 200 series. Reference is made to the description above accompanying FIG. 3 for a more complete description of the features and elements (and alternatives to such features and elements) of the speech translation system 200 illustrated in FIG. 4.

The speech translation system 200 illustrated in FIG. 4 includes a speech recognition assembly 201. The speech translation assembly and the speech parsing assembly of the speech translation system 200 have been removed from FIG. 4 for clarity. However, it should be understood that a speech translation assembly such as the speech translation assembly 103 illustrated in FIG. 3 and described above, and all alternative embodiments thereof, can be used with the speech recognition assembly 201 of FIG. 4.

The speech recognition assembly 201 illustrated in FIG. 4 includes a spoken speech segment parsed and displayed in the display 206, a first laser 208 that produces a first beam of light 241, which is modified by the display 206 to produce a first modified beam of light 243, a second laser 215 that produces a second beam of light 244 that illuminates a holographic storage medium 212 having a plurality of frames 224 to produce a second modified beam of light 246. In other embodiments, a single laser can be used to produce different beams of light directed to the holographic storage medium 212 and the display 206, such as by passing a beam of light from the laser through a beam splitter.

The first modified beam of light 243 and the second modified beam of light 246 are reflected by and pass through a one-way or half silvered mirror 219, respectively. As a result, the first modified beam of light 243 and the second modified beam of light 246 are coincident after being reflected by and passing through the one-way mirror 219, respectively, and can interfere with one another. The resulting combined beam of light 221 is intercepted and received by a detector 217. A correlation detector 222 can therefore detect a correlation between a spoken speech segment that is displayed in the display 206 and a speech segment that is stored on a frame 224 of the holographic storage medium 212 by detecting the amount of interference between the coincident light beams from the one-way mirror 219. In some embodiments, matching speech segments from the display 206 and frame 224 can produce a relatively high or relatively low intensity beam intercepted by the detector 217 (depending upon whether a relatively high degree of constructive or destructive interference between the coincident light beams from the one-way mirror 219 is generated). The degree to which the spoken speech segment matches a speech segment stored in the holographic storage medium 212 can therefore be measured by the intensity of the resulting interference-modified beam of light 221 received by the detector 217. That is, depending on whether the first modified beam of light 243 interferes constructively or destructively with the second modified beam of light 246, the correlation detector 222 can be adapted to detect a minimum or a maximum intensity level.

In use, the second laser 215 and/or the holographic storage medium 212 can be moved with respect to one another to enable the second laser 215 to scan multiple frames 224 in the holographic storage medium 212 in the search for a matching speech segment. As with the other embodiments of the present invention described herein, in those embodiments in which the laser 215 is moved, the detector 217 can be sufficiently large and be shaped to still intercept the resulting interference-modified beam of light 221 and/or can move with the laser 215 in any conventional manner.

Although the first and second beams of light 241, 244 produced by the first and second lasers 208, 215 can be reflected by and pass through the mirror 219, respectively, in other embodiments the positions of the lasers 208, 215 (and the corresponding display 206 and holographic storage medium 212, respectively) can be reversed. In such cases, the first modified beam of light 243 from the display 206 can pass through the mirror 219, while the second modified beam of light 246 can be reflected from the mirror 219 in order to produce the combined beam of light 221 described above.

FIG. 5 illustrates a speech translation system 300 according to yet another embodiment of the present invention. The speech translation system 300 shares many of the same elements and features described above with reference to the speech translation system 100 of FIG. 3. Accordingly, elements and features corresponding to elements and features in the speech translation system 100 are provided with the same reference numerals in the 300 series. Reference is made to the description above accompanying FIG. 3 for a more complete description of the features and elements (and alternatives to such features and elements) of the speech translation system 300 illustrated in FIG. 5.

The speech translation system 300 illustrated in FIG. 5 includes a speech recognition assembly 301. The speech translation assembly and the speech parsing assembly of the speech translation system 300 have been removed from FIG. 5 for clarity. However, it should be understood that a speech translation assembly such as the speech translation assembly 103 illustrated in FIG. 3 and described above, and all alternative embodiments thereof, can be used with the speech recognition assembly 301 of FIG. 5.

The speech recognition assembly 301 illustrated in FIG. 5 includes a first laser 308 that emits a first beam of light 341 directed through a display 306 to form a first modified beam of light 343. The display 306 can display speech segments spoken by a user in a first language as described in greater detail above with respect to the embodiment illustrated in FIG. 3. The first modified beam of light 343 is directed to illuminate the holographic storage medium 312, and acts as an object beam for interference patterns that are stored as frames 324 in the holographic storage medium 312.

By moving the first modified beam of light 343 with respect to the holographic storage medium 312 as also described above (e.g., by moving the first laser 308 and the display 306 in any conventional manner to different positions with respect to the holographic storage medium 312 and/or by moving the holographic storage medium 312 in any conventional manner with respect to the first laser 308 and the display 306), the first modified beam of light 343 can scan multiple frames 324 of the holographic storage medium 312. The resulting light beam exiting the holographic storage medium 312 can be referred to as a second modified beam of light 346. Only when the first modified beam of light 343 matches the object beam used to record a speech segment in a frame 324 of the holographic storage medium 312 is the second modified beam of light 346 a relatively coherent plane wave. A detector 317 is positioned to intercept and receive the second modified beam of light 346.

As described above, a spherical wavefront of an object beam and a coherent plane wave of a reference beam can be used to store data as an interference pattern in a holographic storage medium. Either the object beam or the reference beam can be used to illuminate the stored interference pattern in the holographic storage medium to reconstruct either the reference beam or the object beam, respectively. The embodiments described in FIGS. 3 and 4 reconstruct the object beam 146, 150, 246 of the stored interference pattern by illuminating a holographic storage medium 112*a*, 112*b*, 212 with a reference beam 144, 149, 244 having a particular angle of incidence with respect to the holographic storage medium 112*a*, 112*b*, 212. The embodiment illustrated in FIG. 5, however, uses the object beam 343 of the stored interference pattern to reconstruct the reference beam 346. As such, the reference beam 346 will be emitted from the holographic storage medium 312 at a particular angle that corresponds to each frame 324. Thus, when the first modified beam of light 343 (i.e., the object beam) illuminates a frame 324 of the holographic storage medium 312 that corresponds to the speech segment displayed in the display 306, the second modified beam of light 346 (i.e., a coherent plane wave reference beam) will be reconstructed. That beam of light 346 will illuminate a particular portion of a detector 317 positioned to intercept and receive the second modified beam of light 346.

Therefore, the detector 317 can be used to detect whether the second modified beam of light 346 is a coherent plane wave (or can be used to detect the extent to which the second modified beam of light 346 is a coherent plane wave compared to other modified beams of light 346 passed from other frames 324 of the holographic storage medium 312). When such a coherent plane wave is detected, the correlation detector can determine that the spoken speech segment has been recognized as a speech segment in a frame of the holographic storage medium 312.

Alternatively or in addition, the detector 317 can be used to detect when the position and/or size of illuminated area of the detector 317 corresponds to that of a reference beam from a matching frame 324. Any number of different machine vision systems can be employed in conjunction with the detector 317 in order to determine the location of the illuminated area. Also, the size and/or shape of the illuminated area can be determined in any manner, such as by conventional edge detection techniques. Such detection methods (for detecting reference beams used to create interference patterns in a holographic storage medium) are well known to those in the art and are not therefore described further herein. Depending at least in part upon the size of the detector 317 and the number of detector arrays, panels, or other elements defining the detector 317, the system 300 can identify the second modified beam of light 348 regardless of the angle at which it leaves holographic storage medium 312.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

For example, data in any form can be stored in the various frames 24, 124*a*, 124*b*, 224, 324 of the holographic storage medium 12, 112*a*, 112*b*, 212, 312. For example, the frames 24, 124*a*, 124*b*, 224, 324 can contain data in wave format, which can be compared as described above to data that is also in wave format (e.g., data carried by a modified beam of light from a display 18, 106, 206, 306). As another example, the frames 24, 124*a*, 124*b*, 224, 324 can contain data in alphanumeric and/or other symbol format, which can be recognized by a number of suitable optical character recognition programs receiving such data from the detectors 26, 123, 129, 217, 317. In such cases, the frame 24, 124*a*, 124*b*, 224, 324 can contain any number of characters, such as letters, words, phrases, and the like. When such characters are cast upon a corresponding detector 26, 123, 129, 217, 317, the optical character recognition program can operate in a conventional manner to identify the character(s) for further processing by the systems described above.

Also, it should be noted that the holographic storage media 12, 112a, 112b, 212, 312 according to the present invention can contain data stored in any manner as is well known to those in the art. In some embodiments, words or phrases can be stored alphabetically, by sound, by size, and in any other manner. For example, in some embodiments, words or phrases can be categorized by one or more characteristics of data representing the sounds of words or phrases (e.g., by features of a spectral color distribution of data representing words or phrases, by the shape, size, and/or intensity of images representative of the words or phrases, and the like). As another example, data representative of words and phrases can be stored in the holographic storage media 12, 112a, 112b, 212, 312 as a function of subject matter, such as by storing groups of words and phrases in different portions of the holographic storage media 12, 112a, 112b, 212, 312 and/or by storing groups of words and phrases at different frequencies in the holographic storage media 12, 112a, 112b, 212, 312 based upon context. In this manner, words and phrases relating to different topics and subject matters can define library subsets which the system can search in the speech recognition and translation functions described above. Such organizational techniques can significantly speed the speech recognition and translation functions described herein.

I claim:

1. A speech translation system, comprising:
    a display upon which data corresponding to at least one spoken word of a user is displayed;
    a holographic storage medium having a plurality of frames oriented at different angles within the holographic storage medium, each frame having:
        a first portion carrying data representative of at least one word in a first language, and
        a second portion carrying data representative of at least one word in a second language, wherein the at least one word in the second language is a translation of the at least one word in the first language;
    a first laser positioned to direct a beam of light through the display and the holographic storage medium, at least one of the holographic storage medium and the first laser movable to direct the beam to different frames of the plurality of frames; and
    at least one light detector positioned to receive light from the laser through the holographic storage medium;
    an output device by which translated speech is provided to a user; and
    a correlation detector coupled to the at least one detector and adapted to detect a match between the at least one spoken word upon the display and the data representative of at least one word in the first language in the first portion of a frame, the correlation detector responsive to detection of the match by sending the data representative of the at least one word in the second language in the second portion of the frame to the output device.

2. The speech translation system as claimed in claim 1, wherein the first and second portions of each frame are co-planar.

3. The speech translation system as claimed in claim 1, wherein the first and second portions of each frame lie in planes oriented at an angle with respect to one another, and wherein the angle is greater than zero degrees.

4. The speech translation system as claimed in claim 1, wherein the output device comprises a speech synthesizer.

5. The speech translation system as claimed in claim 1, wherein the first laser is positioned to direct a beam of light through the second portion of the frame in the holographic storage medium to generate a modified beam of light received by the light detector.

6. The speech translation system as claimed in claim 1, further comprising a second laser positioned to direct a beam of light through the second portion of the frame in the holographic storage medium to generate a modified beam of light.

7. The speech translation system as claimed in claim 1, wherein the plurality of frames are angle-multiplexed frames.

8. A speech translation system, comprising:
    a display upon which at least one word spoken by a user in a first language can be displayed;
    a holographic storage medium having a plurality of frames, each frame having data representative of at least one word in the first language and a translation of the at least one word in a second language;
    at least one first laser positioned to direct light to the display to generate a first modified beam of light leaving the display, the first modified beam of light received by the holographic storage medium to generate a second modified beam of light leaving the holographic storage medium, the first modified beam of light carrying information from the display representative of the at least one word spoken by the user in the first language, the second modified beam of light carrying information from the holographic storage medium reflecting a degree of similarity between the at least one word spoken by the user in the first language and at least one word in the first language stored in the holographic storage medium;
    a first detector positioned to receive the second modified beam of light; and
    at least one of the first detector and a second detector positioned to receive a third modified beam of light from the holographic storage medium, the third modified beam of light carrying information from the holographic storage medium representative of a translation in the second language of the at least one word in the first language stored in the holographic storage medium;
    a correlation detector coupled to the first detector and adapted to identify a match between the information from the display and the information from the holographic storage medium reflecting the degree of similarity.

9. The speech translation system as claimed in claim 8, wherein:
    the second modified beam of light leaves a first portion of a first frame of the plurality of frames; and
    the third modified beam of light leaves a second portion of the first frame.

10. The speech translation system as claimed in claim 9, wherein the first and second portions of the first frame are substantially co-planar.

11. The speech translation system as claimed in claim 9, wherein the first and second portions of the first frame lie in planes oriented at an angle with respect to one another, and wherein the angle is greater than zero degrees.

12. The speech translation system as claimed in claim 8, wherein the third modified beam of light is generated by light from the at least one first laser and received by the holographic storage medium.

13. The speech translation system as claimed in claim 8, wherein the third modified beam of light is generated by light from at least one second laser and received by the holographic storage medium.

14. The speech translation system as claimed in claim 8, wherein the at least one first laser is movable to change a positional relationship of the at least one first laser with respect to the holographic storage medium.

15. The speech translation system as claimed in claim 8, wherein the holographic storage medium is movable to change a positional relationship of the at least one first laser with respect to the holographic storage medium.

16. The speech translation system as claimed in claim 8, further comprising an output device by which translated speech is provided to a user.

17. The speech translation system as claimed in claim 8, wherein the correlation detector is adapted to identify a match based at least in part by an intensity of the second modified beam of light.

* * * * *